(12) United States Patent
Goeringer et al.

(10) Patent No.: US 12,470,561 B1
(45) Date of Patent: *Nov. 11, 2025

(54) SYSTEMS AND METHODS FOR ENHANCED NETWORK DETECTION

(71) Applicant: CABLE TELEVISION LABORATORIES, INC., Louisville, CO (US)

(72) Inventors: Steven J. Goeringer, Westminster, CO (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,193

(22) Filed: Sep. 25, 2023

Related U.S. Application Data

(63) Continuation of application No. 17/942,571, filed on Sep. 12, 2022, now Pat. No. 11,770,380, which is a
(Continued)

(51) Int. Cl.
*H04L 9/40* (2022.01)

(52) U.S. Cl.
CPC ........ *H04L 63/102* (2013.01); *H04L 63/1425* (2013.01); *H04L 63/1433* (2013.01); *H04L 63/1441* (2013.01)

(58) Field of Classification Search
CPC ............... H04L 63/102; H04L 63/1425; H04L 63/1433; H04L 63/1441; H04L 63/1408;
(Continued)

(56) References Cited

U.S. PATENT DOCUMENTS

| | | | |
|---|---|---|---|
| 6,490,290 B1 * | 12/2002 | Zhang | H04L 45/00 370/401 |
| 8,510,826 B1 * | 8/2013 | Reams, III | H04L 63/1416 709/225 |

(Continued)

OTHER PUBLICATIONS

Ghaleb et al., "A Framework Architecture for Agentless Cloud Endpoint Security Monitoring," 2019 IEEE Conference on Communications and Network Security (CNS) Year: 2019 | Conference Paper | Publisher: IEEE.*
(Continued)

*Primary Examiner* — Roderick Tolentino
(74) *Attorney, Agent, or Firm* — Armstrong Teasdale LLP

(57) ABSTRACT

A system for detecting and profiling endpoints of a computer network is provided. The system includes a first computing device including at least one processor in communication with at least one memory device. The first computing device is in communication with a computer network. The at least one memory device stores a plurality of instructions, which when executed by the at least one processor cause the at least one processor to receive a plurality of packets transmitted to the computer network, determine an identity of a first end point device associated with the plurality of packets, determine a behavior pattern for the first end point device based on the plurality of packets, and generate a synthetic profile for the first end point device based on the identity and the behavior pattern.

20 Claims, 4 Drawing Sheets

Related U.S. Application Data continuation of application No. 16/551,406, filed on Aug. 26, 2019, now Pat. No. 11,444,948.

(60) Provisional application No. 62/722,399, filed on Aug. 24, 2018.

(58) Field of Classification Search
CPC ............... H04L 45/306; H04L 63/0227; H04L 63/1416; G06F 21/53; G06F 21/552; H04W 24/02; H04W 28/06; G06Q 20/322
See application file for complete search history.

(56) References Cited

U.S. PATENT DOCUMENTS

| | | | | |
|---|---|---|---|---|
| 9,853,982 | B2* | 12/2017 | Mathur | H04L 63/102 |
| 10,505,959 | B1* | 12/2019 | Wang | G06N 20/00 |
| 10,623,289 | B1* | 4/2020 | McCorkendale | H04L 41/142 |
| 10,824,726 | B1* | 11/2020 | Herman Saffar | G06F 21/566 |
| 2008/0256620 | A1* | 10/2008 | Zhang | H04L 47/10 726/12 |
| 2010/0115113 | A1* | 5/2010 | Short | H04L 12/22 709/228 |
| 2014/0219242 | A1* | 8/2014 | Perras | H04W 84/12 370/331 |
| 2015/0071085 | A1* | 3/2015 | Tsirinsky-Feigin | H04L 12/6418 370/242 |
| 2015/0293755 | A1* | 10/2015 | Robins | G06F 9/44526 717/174 |
| 2017/0257341 | A1* | 9/2017 | Arsenault | H04L 67/51 |
| 2017/0264628 | A1* | 9/2017 | Treat | H04L 43/04 |
| 2017/0302663 | A1* | 10/2017 | Nainar | H04L 63/123 |
| 2018/0165431 | A1* | 6/2018 | Neumann | G06F 21/316 |
| 2020/0026536 | A1* | 1/2020 | Li | G06F 9/454 |

OTHER PUBLICATIONS

Zhou et al., "Modeling of Endpoint Feedback Learning Implemented Through Point-to-Point Learning Control," IEEE Transactions on Control Systems Technology Year: 2017 | vol. 25, Issue: 5 | Journal Article | Publisher: IEEE.*

* cited by examiner

SYSTEMS AND METHODS FOR ENHANCED NETWORK DETECTION

CROSS REFERENCE TO RELATED APPLICATIONS

This application is a continuation of U.S. patent application Ser. No. 17/942,571, filed Sep. 13, 2022, which application is a continuation of U.S. patent application Ser. No. 16/551,406, filed Aug. 26, 2019, now U.S. Pat. No. 11,444,948, which issued Sep. 13, 2022. Application Ser. No. 16/551,406 claims the benefit of and priority to U.S. Provisional Patent Application No. 62/722,399, filed Aug. 24, 2018. The entire contents and disclosures of all of the above-referenced applications are incorporated by reference herein in their entireties.

BACKGROUND

The field of the disclosure relates generally to network detection, and more particularly, to systems and methods for detecting and profiling endpoints of a computer network.

One challenge presently facing core networks relates to cybersecurity and identification of network endpoints, and in particular, endpoints that are a part of an end user's network. Core networks have limited visibility into messages that originate from the end user's network, which significantly limits the ability of a network operator of the core network to identify, mitigate, and optimize the network in real-time, or near real-time, in response to network events and conditions. Identifying the endpoints of the core network is necessary to assert contextually network and security protocols. In some cases, endpoints may have end user generate profiles, but such profiles may be inaccurate or tampered with. Accordingly, it is desirable to have profiles that are more securely created and stored for each of the end devices, to improve the core network's understanding of the devices in communication therewith, and also the expected behavior of the devices.

SUMMARY

In an embodiment, a system for detecting and profiling endpoints of a computer network is provided. The system including a first computing device includes at least one processor in communication with at least one memory device. The first computing device is in communication with the computer network. Wherein the at least one memory device stores a plurality of instructions. When executed by the at least one processor the instructions cause the at least one processor to receive a plurality of packets transmitted to the computer network, determine an identity of a first end point device associated with the plurality of packets, determine a behavior pattern for the first end point device based on the plurality of packets, and generate a synthetic profile for the first end point device based on the identity and the behavior pattern.

In another embodiment, a method for detecting and profiling endpoints of a computer network is provided. The method includes receiving a plurality of packets transmitted to the computer network. The method also includes determining an identity of a first end point device associated with the plurality of packets. The method further includes determining a behavior pattern for the first end point device based on the plurality of packets. In addition, the method includes generating a synthetic profile for the first end point device based on the identity and the behavior pattern.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
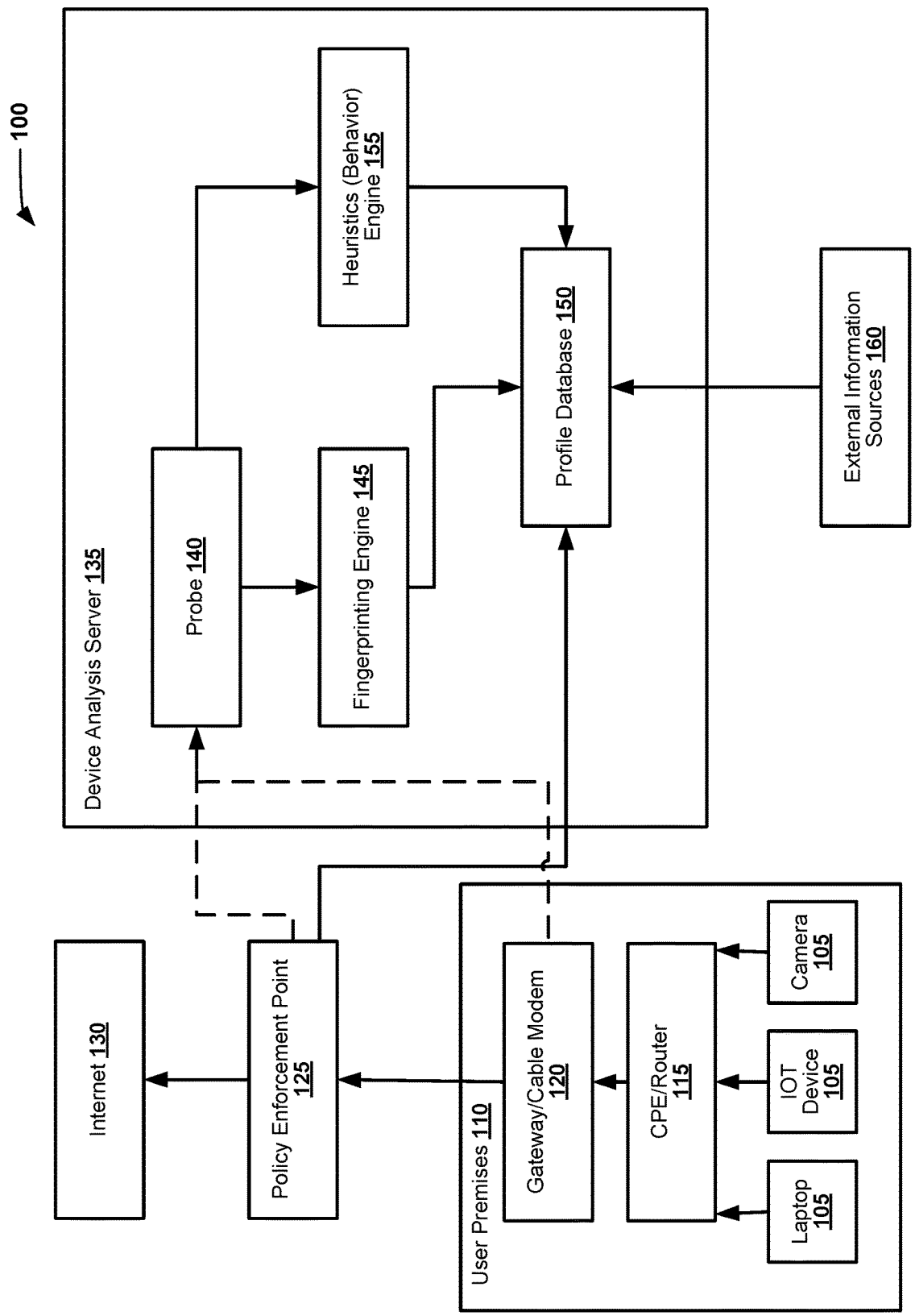
FIG. 1 is a schematic illustration of a system for monitoring and optimizing core networks in response to communications from end user computer devices.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The embodiments described herein provide innovative systems and methods for monitoring, analyzing, and maintaining the security status of a core network. The embodiments described herein further provide systems and methods for monitoring, analyzing, and maintaining the security status of a core network. In an embodiment, a device analysis server interfaces with gateways associated with an end user and/or policy enforcement points. In an exemplary embodiment, the device analysis server serves to function as an analyzing interface, or "midbox", for monitoring data flows and communications along the network, and for detecting and analyzing end devices on the network.

As described further herein, the device analysis server may further dynamically detect end point devices, including those that may be hidden or obfuscated behind gateways, based on communications through the gateways and/or the policy enforcement points. In some embodiments, the device analysis server uses the communications to generate synthetic profiles of the end point devices. The synthetic profiles include identification information and behavioral information associated with the end points devices.

In some embodiments, the policy enforcement points and/or the gateways use the synthetic profiles of the devices to confirm that the communications coming from the gateway have not been compromised, such as from a cybersecurity threat. In some embodiments, the packets of the communications are identified based on a fingerprint of the device's communication in the profile and then the behavior of the packets is analyzed based on the determined behavioral pattern of the end point device. If the communications are out of the normal behavior pattern, the policy enforcement points and/or the gateways may drop the packets from the end point device to prevent further compromise. In some further embodiments, the policy enforcement points and/or the gateways may notify the user of the potential compromise.

While the systems and methods described herein are based on communications with a core network, the person of ordinary skill in the art will understand, after reading and comprehending the present disclosure, that the principles and techniques described herein may be advantageously used with other networks where network and end point discovery is valuable.

FIG. 1 is a schematic illustration of a system 100 for detecting and analyzing end point devices 105 on a core network in accordance with at least one embodiment. User end point devices 105 may, for example include without limitation a desktop computer, a laptop computer, a personal digital assistant (PDA), a cellular phone, a smartphone, a tablet, a phablet, wearable electronics, smart watch, an IP camera, Internet of Things devices (such as smart lightbulbs, etc.), and/or other web-based connectable equipment or mobile devices.

In the exemplary embodiment, user end point devices 105, such as laptops, IoT devices, and cameras that are associated with a plurality of end users, are connected to a CPE/router 115, such as over a wired connection (e.g., Ethernet), a wireless connection (e.g., Wi-Fi), or an Internet of Things (IoT)-type connection. Individual CPEs/Routers 115 may then operably connect to a respective gateway/modem 120. In some embodiments, CPE/Router 115 and gateway/modem 120 are integrated into the same device. In other embodiments, CPE/Router 115 and gateway/modem 120 are separate devices, which may be remotely located from one another. Gateway 120 connects devices 105 to the core network through a policy enforcement point 125. In some embodiments, gateway 120 is a modem, a cable modem, a satellite modem, or an optical network unit (ONU). In other embodiments, gateway 120 is another type of device that enables the system 100 to operate as described herein. In some embodiments, user end point devices 105 are visible to the core network. In other embodiments, user end point devices 105 are hidden from the core network, such as behind gateway 120.

In an embodiment, policy enforcement point 125 is a security system that determines whether or not messaging traffic from gateway 120 is allowed to access Internet 130. In an exemplary embodiment, system 100 is configured for monitoring communications from user end point devices 105 on a user premises 110 via a device analysis server 135. Device analysis server 135 may, for example, be configured to generate, store, and update synthetic device profiles for detected user end point devices 105. In the exemplary embodiment, device analysis server 135 includes a probe 140 that receives data about messaging traffic from at least one of gateway 120 and policy enforcement point 125. In some embodiments, probe 140 receives the data automatically. In other embodiments, probe 140 receives the data after requesting the data from gateway 120 and/or policy enforcement point 125. In some embodiments, the data received by probe 140 includes packet data that has been copied and forwarded from gateway 120 and/or policy enforcement point 125. In the exemplary embodiment, device analysis server 135 further includes a fingerprinting engine 145 and a profile database 150.

In an embodiment, policy enforcement point 125 determines whether to allow the messaging traffic to access Internet 130 based on information from profile database 150, such as a synthetic profile of user end point device 105 transmitting the messaging traffic. In some embodiments, policy enforcement point 125 is associated with or a part of gateway 120. In other embodiments, policy enforcement point 125 is separate from gateway 120. In some of these embodiments, policy enforcement point 125 is remote from user premises 120. In further embodiments, policy enforcement point 125 transmits information about devices 105 to profile database 150. This information may include certificates associated with devices 105, identifiers, manufacturer usage descriptions (MUDs), and device- or user-provided profiles. Profile database 150 may then store this information (i.e., in a memory, not shown in FIG. 1) for future use and analysis. In addition, profile database 150 may store provisioning profiles from when device 105 was originally provisioned.

In at least one embodiment, policy enforcement point 125 intercepts message traffic from user end point device 105. Policy enforcement point 125 accesses one or more synthetic profiles associated with user end point devices 105 associated with gateway 120. Policy enforcement point 125 may use these one or more synthetic profiles to determine which user end point device 105 is associated with the messaging traffic. Based on the determination and a plurality of stored rules, policy enforcement point 125 determines whether or not to allow the identified user end point device 105 to access Internet 130. In some embodiments, policy enforcement point 125 analyzes the messaging traffic for unusual behavior or other behavior that may indicate that user end point device 105 has been compromised, such as participating in a distributed denial-of-service (DDOS) attack.

In an exemplary embodiment, device analysis server 135 further includes a heuristics (behavior) engine 155, and probe 140 is configured to send the received data to fingerprinting engine 145 and a heuristics engine 155. In at least one embodiment, fingerprinting engine 145 receives the packet data, extracts information about the packet, such as, but not limited to, source, destination, and payload. Fingerprinting engine 145 may then determine a fingerprint analysis of the packet and user end point device 105 associated with that packet. Fingerprinting engine 145 analyzes the packet to determine which device 105 behind gateway 120 is associated with the packet. In some embodiments, fingerprinting engine 145 identifies device 105 using some combination of the media access control (MAC) address, the gateway, and the local IP address. In an embodiment, fingerprinting engine 145 has access to a list of known devices 105 associated with gateway 120, such as stored in profile database 150. This list may include devices 105 that were identified by the user as being attached to gateway 120. The list may also include devices 105 that have been discovered by device analysis server 135. In the exemplary embodiment, fingerprinting engine 145 uses the analysis of a plurality of packets associated with a particular device 105 to generate a fingerprint of the device. This fingerprint of device 105 may then be used to recognize packets and data associated with device 105 when transmitted to policy enforcement point 125.

In some embodiments, fingerprinting engine 145 may determine the type of device 105. Fingerprinting engine 145 may look at flows and identify patters for different device types. Fingerprinting engine 145 may analyze the protocols and encryption used in flows for device 105, to narrow down the types of devices.

Heuristic engine 155 may be further configured to analyze the packet data to generate a profile of expected behavior of device 105. Heuristic engine 155 uses the analysis of a plurality of packets associated with device 105 to generate a blueprint of expected behavior of device 105. In an exemplary embodiment, device analysis server 135 associates the blueprint of behavior with the fingerprint of device 105 to create a synthetic profile of device 105. In some embodiments, device analysis server 135 also includes information from external information sources 160 in the profile, including, for example, manufacturer usage descriptions or other device profiles. In an embodiment, the synthetic profile is stored in profile database 150.

In exemplary operation, when a packet is received from a particular device 105 at user premises 110, policy enforcement point 125 retrieves the profiles of devices 105 associated with user premises 110 from profile database 150. Policy enforcement point 125 uses these profiles to identity the particular device 105 associated with the packet, and then policy enforcement point 125 analyzes the behavior of that device 105, including the received packet, to determine if the behavior of that device 105 may constitute a cybersecurity risk, or otherwise does not fit an expected pattern of behavior. Policy enforcement point 125 may then decide whether or not to allow the packet to pass through to its destination or be dropped.

In one example, device 105 may be a smart lightbulb and the synthetic profile for device 105 includes an expected behavior for the device, such as once-a-day updates, and occasional other messages. When policy enforcement point 125 determines that device 105 is sending out a large number of packets out of the expected pattern of behavior for that device, policy enforcement point 125 may determine that device 105 is a part of a DDOS attack and drop packets from device 105 until the issue is resolved, or behavior returns to "normal".

In some embodiments, policy enforcement point 125 may compare the synthetic device profile with one or more user- or device-provided profiles to validate device 105. If there is a major discrepancy, policy enforcement point 125 may prevent packets from device 105 from being transmitted through to Internet 130. The discrepancies may be indicators of tampering or other anomalies indicative of various types of cyber compromise. In some embodiments, policy enforcement point 125 may notify the user of the discrepancies.

In some embodiments, the synthetic profiles are used to configure or manage networks to support functional roles. For example, organizing all smart lightbulbs on user premises 110 into a common subnet, and identifying the appropriate functional control elements thereof. The synthetic profiles may also be used to select and apply reasonable security controls, such as, but not limited to, rate limiting, access control lists, and firewall settings.

In an embodiment, device analysis server 135 may further include a machine learning (ML) driven software defined network (SDN) controller (not shown). The ML-driven SDN controller may be configured to combine intelligent traffic analysis with the synthetic device profiles. The ML-driven SDN controller may be further configured to determine which rules to implement based on dynamic network traffic, and to update policy enforcement point 125, gateways 120, and routers 115, accordingly. In some embodiments, the ML-driven SDN controller includes network optimization engines, connections to operator systems, connections to consumer systems, cloud-based meta-analytics for overall Internet traffic, and another other components required for specific use cases. The ML-driven SDN controller may use the synthetic profiles to (i) detect and identify network conditions and devices, (ii) match streams of packets to behavior patterns, and/or (iii) provide near real-time decision making.

The present embodiments may thus advantageously employ multiple techniques to identify the types of devices 105 on end user premises 110: (i) end users may specify which devices 105 are owned thereby, and which have connected to gateway 120, such as through a web portal; (ii) for devices 105 with a web browser, end users may interface with a webpage that automatically records the device type; (iii) end users may install an application on devices 105 to share the device type; (iv) MAC addresses may further provide some information about the manufacture of the network adapter; (v) gateway 120 may be configured to probe device 105 to identify the device, such as by analyzing which ports are open and the information that can be viewed therefrom; (vi), fingerprinting engine 145 may look at flows and identify patters for different device types; and/or (vii) fingerprinting engine 145 may analyze the protocols and encryption used in flows for device 105 to narrow down the types of devices.

Figure 2:
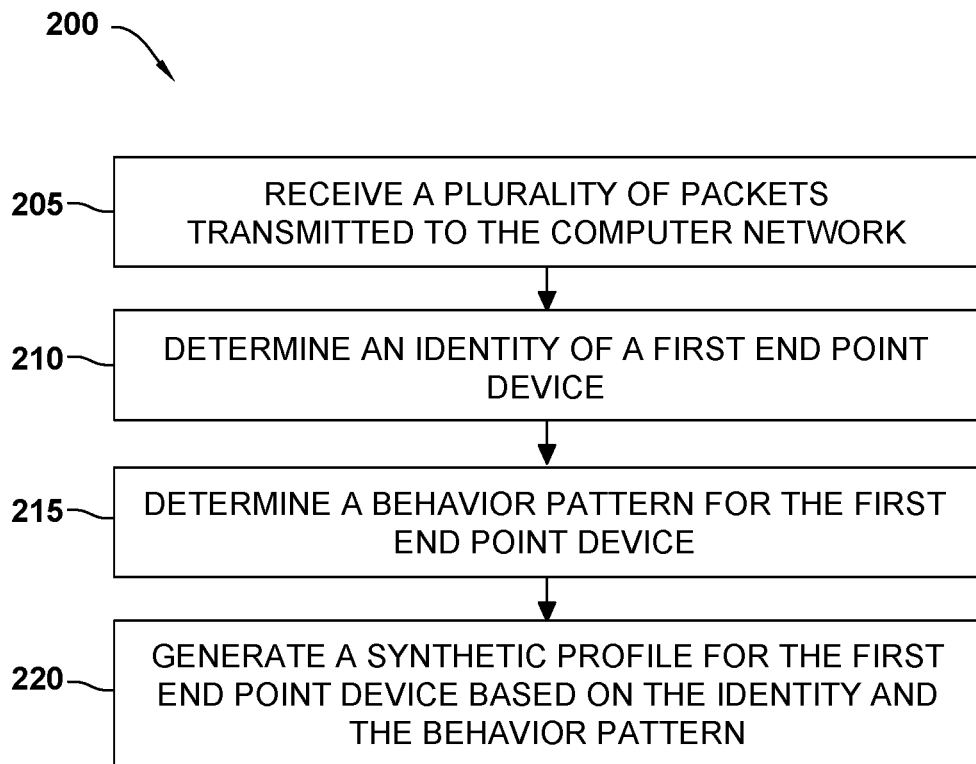
FIG. 2 is a flowchart illustrating an example of a process of generating a synthetic profile for an end point device using the system shown in FIG. 1, in accordance with one embodiment of the disclosure.

FIG. 2 is a flowchart illustrating an example of a process 200 of generating a synthetic profile for end point device 105, FIG. 1, using system 100, in accordance with one embodiment of the disclosure. In an exemplary embodiment, process 200 is performed by device analysis server 135 in communication with at least one of policy enforcement point 125 and gateway 120 (also both shown in FIG. 1). In the exemplary embodiment, process 200 may be executed as a series of steps, which may be performed in the following order, a different order, or with two or more steps being performed simultaneously.

In the exemplary embodiment, process 200 begins at step 205, in which device analysis server 135 receives a plurality of packets transmitted to a computer network, such as the core network. In some embodiments of step 205, the plurality of packets are associated with a first end point device, such as user end point device 105, FIG. 1. In step 210, device analysis server 135 determines an identity of the first end point device associated with the plurality of packets. In some embodiments, the identity of the first end point device is determined by fingerprinting engine 145, FIG. 1. In step 215, device analysis server 135 determines a behavior pattern for the first end point device based on the plurality of packets. In some embodiments of step 215, the behavior pattern of the first end point device is determined by heuristics engine 155, FIG. 1. In step 220, device analysis server 135 generates a synthetic profile for the first end point device based on the identity and the behavior pattern. In some embodiments of step 220, device analysis server 135 stores the synthetic profile in profile database 150, FIG. 1.

In an embodiment of process 200, device analysis server 135 may be further configured to receive a plurality of data associated with the first end point device from one or more external data sources, such as external information sources 160, FIG. 1. In this example, device analysis server 135 may update the synthetic profile based on the plurality of data.

In some embodiments of process 200, the plurality of packets is also associated with a second end point device. In this case, device analysis server 135 detects the second end point device based on the plurality of packets. Device analysis server 135 may thus determine a second identity of a second end point device associated with the plurality of packets. In an embodiment, device analysis server 135 may further determine a second behavior pattern for the second end point device based on the plurality of packets. Device analysis server 135 generates a second synthetic profile for the second first end point device based on the second identity and the second behavior pattern, and may then store the second synthetic profile in profile database 150.

In some embodiments, device analysis server 135 receives a second plurality of packets from the first end point device and updates the synthetic profile based on the second plurality of packets. In at least one embodiment, device analysis server 135 receives the second plurality of packets from an intercept point computer device, which may be, or be associated with, a gateway associated with the first end point device, such as gateway 120. In other embodiments, the intercept computer device may instead be associated with the computer network and configured to determine whether the first end point device may access the computer network, such as at policy enforcement point 125.

In some embodiments, the intercept point computer device receives a packet from the first end point device and determines whether to route the packet to its destination based on the analysis. In further embodiments, the intercept point computer device retrieves the synthetic profile associated with the first end point device. The intercept point computer device compares the packet to the synthetic profile, and then may determine whether to route the packet based on the comparison. In other embodiments, the intercept point computer device receives a device profile associated with the first end point device, and then retrieves the synthetic profile associated with the first end point device and compares the device profile to the synthetic profile. The intercept point computer device may then determine whether to route the packet based on the comparison.

While the systems and methods described herein are based on communications with a core network, the person of ordinary skill in the art will further understand how the present principles and techniques are further applicable with other networks, for network and end point discovery.

Figure 3:
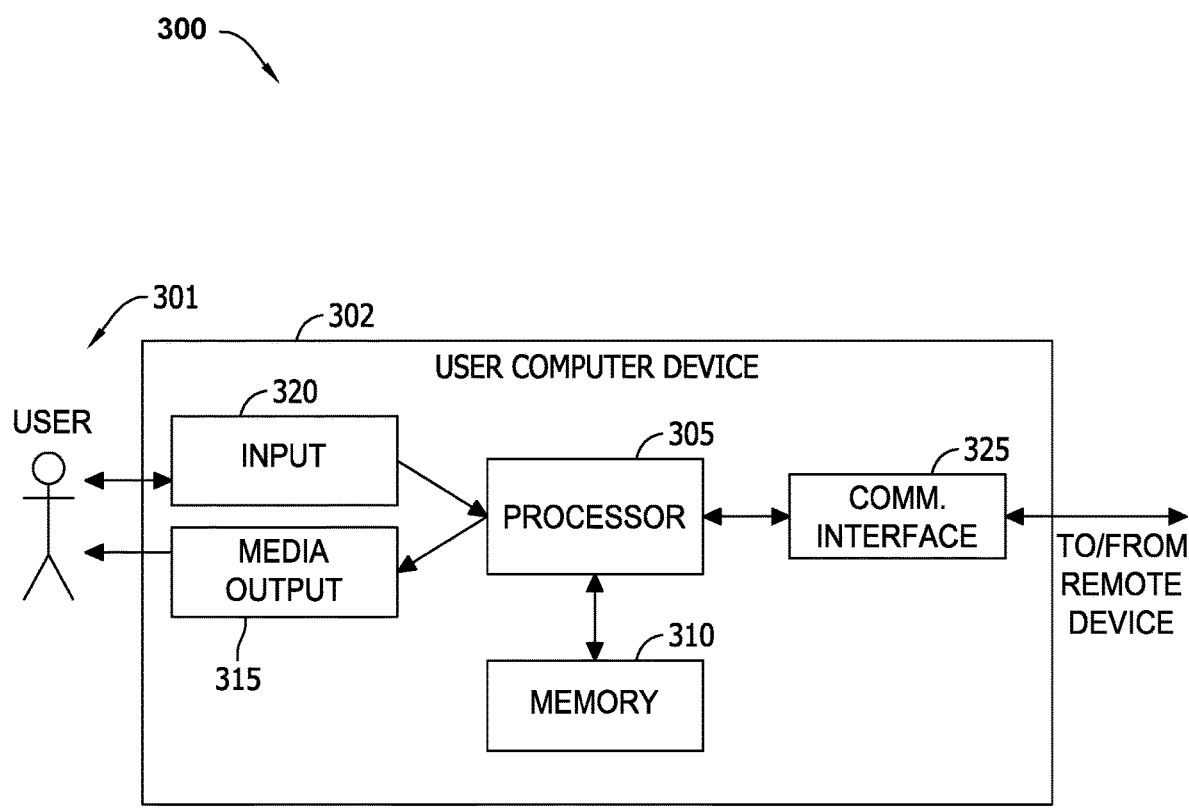
FIG. 3 illustrates an example configuration of a client computer device shown in FIG. 1, in accordance with one embodiment of the present disclosure.

FIG. 3 illustrates an example configuration of a client system 300 for a user 301. In an exemplary embodiment, client system 300 may be similar in structure and functionality to portions of system 100, FIG. 1. System 300 includes a user computer device 302 operated by user 301. In an embodiment, user computer device 302 may include, but is not limited to, user end point device 105 and policy enforcement point 125, FIG. 1, and further includes a processor 305 for executing executable instructions, which may be stored in a memory area 310. Processor 305 may, for example, include one or more processing units (e.g., in a multi-core configuration, not shown). Memory area 310 may include a storage device or unit that enables information, such as executable instructions and/or transaction data, to be stored and retrieved, and may further include one or more computer readable media.

In an exemplary embodiment, user computer device 302 further includes at least one media output component 315 for presenting information to user 301. Media output component 315 may, for example, include a hardware unit or component capable of conveying information to user 301. In some embodiments, media output component 315 includes an output adapter (not shown), such as a video adapter and/or an audio adapter, which is operatively coupled to processor 305, and also to an output device such as a display device (e.g., a cathode ray tube (CRT), liquid crystal display (LCD), light emitting diode (LED) display, "electronic ink" display, etc.) and/or an audio output device (e.g., a speaker or headphones). In some embodiments, media output component 315 is configured to present a graphical user interface to user 301, which may include, for example, an interface for performing an ecommerce transaction (e.g., a web browser and/or a client application).

In some embodiments, user computer device 302 includes an input device 320 for receiving input from user 301. User 301 may use input device 320 to, without limitation, perform an ecommerce transaction. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component, such as a touch screen, may function as both an output device of media output component 315 and input device 320.

User computer device 302 may also include a communication interface 325, communicatively coupled to a remote device such as device analysis server 135, FIG. 1. Communication interface 325 may also be in communication with gateway 120, FIG. 1, which routes communication to and from Internet 130, FIG. 1. Communication interface 325 may further include, for example, a wired or wireless network adapter and/or a wireless data transceiver for use with a mobile telecommunications network.

Stored in memory area 310 may be, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from device analysis server 135. A client application allows user 301 to interact with, for example, device analysis server 135 to provision user computer device 302 or another user end point device 105. For example, instructions may be stored by a cloud service, and the output resulting from execution of the executable instructions may be sent to media output component 315.

In exemplary operation, processor 305 executes computer-executable instructions for implementing aspects of the present disclosure. In some embodiments, processor 305 is transformed into a special purpose microprocessor by the execution of the specialized computer-executable instructions, or otherwise due to special programming.

Figure 4:
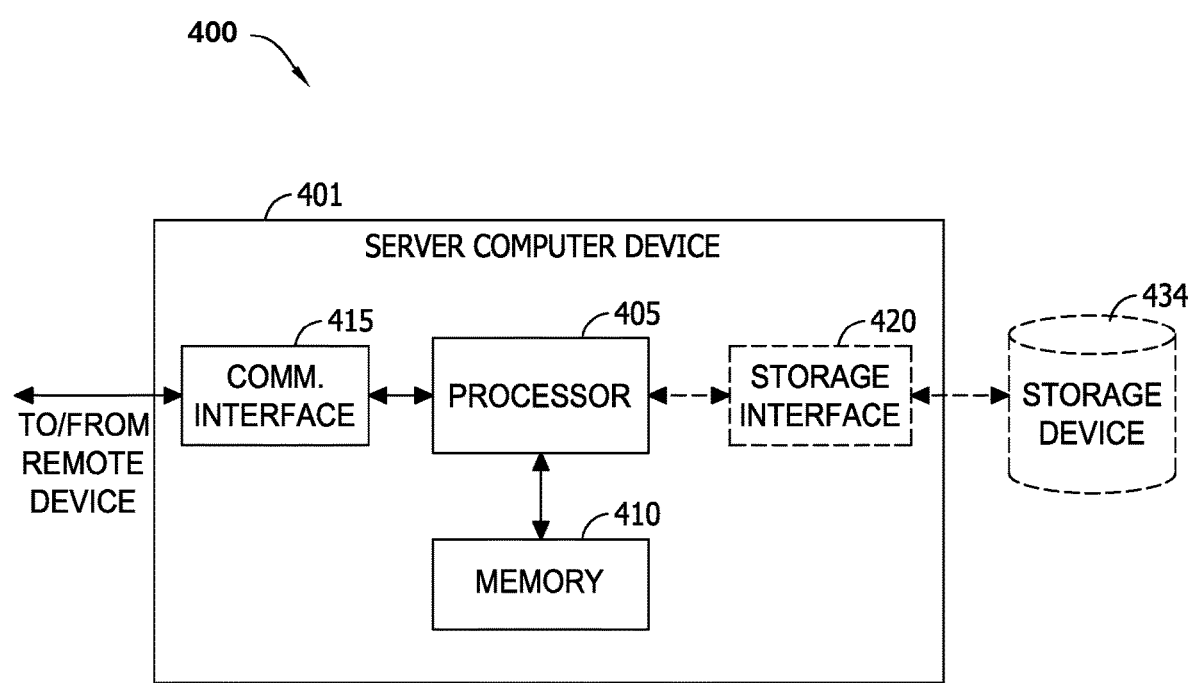
FIG. 4 illustrates an example configuration of the server system shown in FIG. 1, in accordance with one embodiment of the present disclosure.

FIG. 4 illustrates an example configuration of a server system 400. In an exemplary embodiment, server system 400 may also be similar in structure and functionality to portions of system 100, FIG. 1, and include a server computer device 401. Server computer device 401 may include, but is not limited to, policy enforcement point 125, device analysis server 135, fingerprinting engine 145, and heuristic engine 155 (all shown in FIG. 1). In an embodiment, server computer device 401 further includes a processor 405 for executing instructions stored in a memory area 410. Processor 405 may include one or more processing units (e.g., in a multi-core configuration).

In an exemplary embodiment, processor 405 is operatively coupled to a communication interface 415 such that server computer device 401 is capable of communicating with a remote device, such as another server computer device 401, another device analysis server 135, policy enforcement point 125, or user end point devices 105 (shown in FIG. 1). For example, communication interface 415 may receive requests from policy enforcement point 125 via Internet 130, as described above with respect to FIG. 1.

In an embodiment, processor 405 may also be operatively coupled to a storage device 434, which may be, or include, a computer-operated hardware unit or module suitable for storing and/or retrieving data, such as, but not limited to, data associated with profile database 150. In some embodiments, storage device 434 is integrated in server computer device 401. For example, server computer device 401 may include one or more hard disk drives in or with storage device 434. In other embodiments, storage device 434 may be external to server computer device 401, and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 may, for example, include or be a component/unit/module capable of providing processor 405 with access to storage device 434, such as an Advanced Technology Attachment (ATA) adapter, a Serial ATA (SATA) adapter, a Small Computer System Interface (SCSI) adapter, a RAID controller, a SAN adapter, a network adapter, and/or another component configured to provide processor 405 with access to storage device 434.

In exemplary operation, processor 405 executes computer-executable instructions for implementing aspects of the disclosure. In some embodiments, processor 405 is transformed into a special purpose microprocessor through execution of specialized computer-executable instructions, or otherwise by being programmed with specialized software. For example, processor 405 may be programmed with instructions such as those described above with respect to FIG. 2.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles or mobile devices, or associated with smart infrastructure or remote servers), and/or through implementation of computer-executable instructions stored on non-transitory computer-readable media or medium.

Additionally, the computer systems discussed herein may include additional, fewer, or alternate functionality, including that discussed elsewhere herein, and may include or be implemented according to computer-executable instructions stored on non-transitory computer-readable media or medium. Unless described herein to the contrary, the various steps of the several processes may be performed in a different order, or simultaneously in some instances.

Processors or a processing elements utilized with respect to the present systems and methods may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as communication data of compromised and uncompromised devices, communication data from a wide variety of devices, and communication data of a wide variety of malicious sources. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the device, network, policies, communications, activities, software, hardware, malicious code, and/or other data.

In the exemplary embodiment, a processing element may be trained by providing it with a large sample of communication data with known characteristics or features. Such information may include, for example, information associated with a specific device, type of device, device activity, network activity, software versions, and/or other data.

Based upon these analyses, the respective processing element of the present embodiments may learn how to identify characteristics and patterns that may then be applied to analyzing communication data. For example, the processing element may learn, with the user's permission or affirmative consent, to identify the attached device and communication data associated with those security vulnerabilities being compromised. This information may be used to determine how to identify device and to recognize compromise in those devices.

The exemplary embodiments provided herein describe a device analysis server that is advantageously disposed within the core network, or in communication with the core network, to detect end point devices and identify those devices and their expected behavior. The device analysis server thus functions as a midbox capable of: (i) identifying devices communicating from beyond a gateway or firewall; (ii) determining the attributes and expected behavior of those devices; (iii) recognizing when those devices are potentially compromised; and/or (iv) acting to limit the potential compromises.

The improvements described herein may be achieved by performing one or more of the following steps: (a) receiving a plurality of packets transmitted to the computer network; (b) determining an identity of a first end point device associated with the plurality of packets; (c) determining a behavior pattern for the first end point device based on the plurality of packets; (d) generating a synthetic profile for the first end point device based on the identity and the behavior pattern; (e) receiving a plurality of data associated with the first end point device from one or more external data sources; (f) updating the synthetic profile based on the plurality of data; (g) detecting a second end point device based on the plurality of packets; (h) determining an second identity of a second end point device associated with the plurality of packets; (i) determining a second behavior pattern for the second end point device based on the plurality of packets; (j) generating a second synthetic profile for second first end point device based on the second identity and the second behavior pattern; (k) receiving a second plurality of packets from the first end point device; (l) updating the synthetic profile based on the second plurality of packets; (m) receiving the plurality from an intercept point computer device, wherein the intercept point computer device is one of a gateway associated with the first end point device and a computer device associated with the computer network that determines whether or not the first end point device may access the computer network; (n) receiving a packet from the first end point device; (o) determining whether to route the packet to its destination based on the analysis; (p) retrieving the synthetic profile associated with the first end point device; (q) comparing the packet to the synthetic profile; (r) determining whether or not to route the packet based on the comparison; (s) receiving a device profile associated with the first end point device; (t) retrieving the synthetic profile associated with the first end point device; (u) comparing the device profile to the synthetic profile; and/or (v) determining whether or not to route the packet based on the comparison.

The aspects described herein may be implemented as part of one or more computer components, such as a client device and/or one or more back-end components, such as a device analysis server, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more accurately predicting and/or identifying the present security status of one or more (or all) connected devices. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security and network detection, for example.

Accordingly, the innovative systems and methods described herein are of particular value within the realm of core networks, which are a constantly evolving technology as there are constantly increased demands for more bandwidth and speed from consumers. The present embodiments enable more reliable updating and control of such devices, but without compromising data and communications. Furthermore, according to the disclosed techniques, service providers and network operators are better able to monitor and protect the networks from connected devices, and thereby protect other devices on the network. Moreover, the ability to more reliably route packets, but without adding additional risk to consumer data, greatly enhances the ability of manufacturers to realize secondary market revenue for a device, such as in the case of software updates to the device programming, or new commercial opportunities that may be exploited in association with the device (e.g., marketing promotions, cross-sales, seasonal activities).

Exemplary embodiments of systems and methods for managing and securing core networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting and profiling endpoints of a computer network comprising a first computing device comprising at least one processor in communication with at least one memory device, wherein the first computing device is in communication with the computer network including a plurality of end point devices, and wherein the at least one memory device stores a plurality of instructions, which the at least one processor is programmed to:
   store a plurality of synthetic profiles for a plurality of end point devices on the computer network including a first synthetic profile for a first end point device of the plurality of end point devices, wherein each synthetic profile of the plurality of synthetic profiles includes a behavior pattern for the corresponding end point device, wherein each behavior pattern is based upon analysis of a plurality of packets transmitted to and from the plurality of end point devices, wherein the plurality of synthetic profiles includes a second synthetic profile for a second end point device of the plurality of end point devices;
   receive a first packet transmitted from the first end point device of the plurality of end point devices on the computer network;
   identify the first packet as being transmitted by the first end point device;
   identify the first packet as being transmitted to the second end point device;
   retrieve the first synthetic profile of the plurality of synthetic profiles and the second synthetic profile;
   compare the first packet to the behavior pattern of the first synthetic profile;
   compare the first packet to the second synthetic profile;
   determine whether or not to route the first packet based on the comparison of the first packet to the behavior pattern of the first synthetic profile and the comparison of the first packet to the second synthetic profile; and
   route or drop the first packet based upon the comparison.

2. The system in accordance with claim 1, wherein the plurality of synthetic profiles includes a second synthetic profile for a second end point device of the plurality of end point devices, and wherein the at least one processor is further programmed to:
   receive a second packet transmitted from the second end point device on the computer network;
   identify the second packet as being transmitted by the second end point device;
   retrieve the second synthetic profile;
   compare the second packet to the second synthetic profile; and
   determine whether or not to route the first packet based on the comparison of the second packet to the second synthetic profile.

3. The system in accordance with claim 1, wherein the at least one processor is further programmed to:
   receive a third packet transmitted to the computer network;
   identify the third packet as being transmitted to the first end point device;
   retrieve the first synthetic profile of the plurality of synthetic profiles;
   compare the first packet to the first synthetic profile; and
   determine whether or not to route the first packet to the first end point device based on the comparison of the first packet to the first synthetic profile.

4. The system in accordance with claim 1, wherein the at least one processor is further programmed to:
   receive a user profile for the first end point device; and
   compare the user profile for the first end point device to the behavior pattern to detect any anomalies.

5. The system in accordance with claim 1, wherein the at least one processor is further programmed to:

receive a plurality of packets associated with the computer network;
detect a new end point device associated with the plurality of packets;
determine an identity and a behavior pattern for the new end point device based on the plurality of packets; and
generate a new synthetic profile for the new end point device based on the identity and the behavior pattern.

6. The system in accordance with claim 5, wherein the instructions further cause the at least one processor to:
receive a plurality of data associated with the new end point device from one or more external data sources; and
update the new synthetic profile based on the plurality of data.

7. The system in accordance with claim 5, wherein the instructions further cause the at least one processor to identify the new end point device based upon an IP address, a MAC address, and gateway information.

8. The system in accordance with claim 5, wherein the instructions further cause the at least one processor to:
determine a type for the new end point device based upon the behavior pattern; and
update the new synthetic profile based upon the type for the new end point device.

9. The system in accordance with claim 1, wherein the first computing device is a gateway associated with the computer network.

10. The system in accordance with claim 9, wherein the first computing device is between the computer network and an external computer network.

11. The system in accordance with claim 10, wherein the external computer network is the Internet.

12. The system in accordance with claim 11, wherein the first computing device determines whether or not the first end point device may access the external computer network.

13. The system in accordance with claim 11, wherein the first computing device determines whether or not the first end point device may be accessed by the external computer network.

14. A method for detecting and profiling endpoints of a computer network comprising:
storing a plurality of synthetic profiles for a plurality of end point devices on the computer network including a first synthetic profile for a first end point device of the plurality of end point devices, wherein each synthetic profile of the plurality of synthetic profiles includes a behavior pattern for the corresponding end point device, wherein each behavior pattern is based upon analysis of a plurality of packets transmitted to and from the plurality of end point devices, wherein the plurality of synthetic profiles includes a second synthetic profile for a second end point device of the plurality of end point devices;
receiving a first packet transmitted from the first end point device of the plurality of end point devices on the computer network;
identifying the first packet as being transmitted by the first end point device;
identifying the first packet as being transmitted to the second end point device;
retrieving the first synthetic profile of the plurality of synthetic profiles and the second synthetic profile;
comparing the first packet to the behavior pattern of the first synthetic profile;
comparing the first packet to the second synthetic profile;
determining whether or not to route the first packet based on the comparison of the first packet to the behavior pattern of the first synthetic profile and the comparison of the first packet to the second synthetic profile; and
routing or dropping the first packet based upon the comparison.

15. The method in accordance with claim 14, wherein the plurality of synthetic profiles includes a second synthetic profile for a second end point device of the plurality of end point devices, and wherein the method further comprises:
receiving a second packet transmitted from the second end point device on the computer network;
identifying the second packet as being transmitted by the second end point device;
retrieving the second synthetic profile;
comparing the second packet to the second synthetic profile; and
determining whether or not to route the first packet based on the comparison of the second packet to the second synthetic profile.

16. The method in accordance with claim 14 further comprising:
receiving a user profile for the first end point device; and
comparing the user profile for the first end point device to the behavior pattern to detect any anomalies.

17. The method in accordance with claim 14 further comprising:
receiving a plurality of packets associated with the computer network;
detecting a new end point device associated with the plurality of packets;
determining an identity and a behavior pattern for the new end point device based on the plurality of packets; and
generating a new synthetic profile for the new end point device based on the identity and the behavior pattern.

18. The method in accordance with claim 14, wherein the method is implemented on a first computing device that is a gateway associated with the computer network, wherein the first computing device is between the computer network and an external computer network, wherein the external computer network is the Internet, and wherein the method further comprises determining whether or not the first end point device may access the external computer network.

19. The method in accordance with claim 17 further comprising:
receiving a plurality of data associated with the new end point device from one or more external data sources; and
updating the new synthetic profile based on the plurality of data.

20. The method in accordance with claim 17 further comprising:
identifying the new end point device based upon an IP address, a MAC address, and gateway information;
determining a type for the new end point device based upon the behavior pattern; and
updating the new synthetic profile based upon the type for the new end point device.

* * * * *